United States Patent [19]
Elliott

[11] Patent Number: 5,222,990
[45] Date of Patent: Jun. 29, 1993

[54] PET FEEDER APPARATUS

[76] Inventor: Mark A. Elliott, 321 Stafford St., Lynchburg, Va. 24501

[21] Appl. No.: 916,473

[22] Filed: Jul. 20, 1992

[51] Int. Cl.⁵ ............................................. A01K 5/00
[52] U.S. Cl. ..................................... 119/51.5; 119/61
[58] Field of Search .................. 119/51.01, 51.5, 61, 119/18, 52.1

[56] References Cited

U.S. PATENT DOCUMENTS

| | | | |
|---|---|---|---|
| 1,063,661 | 6/1913 | Critz | 119/61 |
| 1,522,084 | 1/1925 | Swearingen | 119/52.1 |
| 2,576,154 | 11/1951 | Trautvetter | 119/61 |
| 2,845,896 | 8/1958 | Copeland | 119/61 |
| 2,931,334 | 4/1960 | Hammond | 119/61 |
| 3,651,787 | 3/1972 | Cooper | 119/61 |
| 4,029,051 | 6/1977 | McKinney | 119/61 |
| 4,324,202 | 4/1982 | Stonestreet et al. | 119/61 |
| 4,699,089 | 10/1987 | Teschke | 119/61 |
| 4,976,223 | 12/1990 | Pierce | 119/61 |

Primary Examiner—John G. Weiss
Attorney, Agent, or Firm—Leon Gilden

[57] ABSTRACT

A feeder includes a housing having spaced side walls, including an angulated roof overlying a floor, with the roof including a roof trough at a forward edge of the roof to direct rainwater away from the floor surface. The organization is arranged to include at least one feeder bowl mounted within the floor, with a chute directed rearwardly of the housing projecting through an associated fence wall to permit filling selectively of food within the bowl exteriorly of the fence.

6 Claims, 4 Drawing Sheets

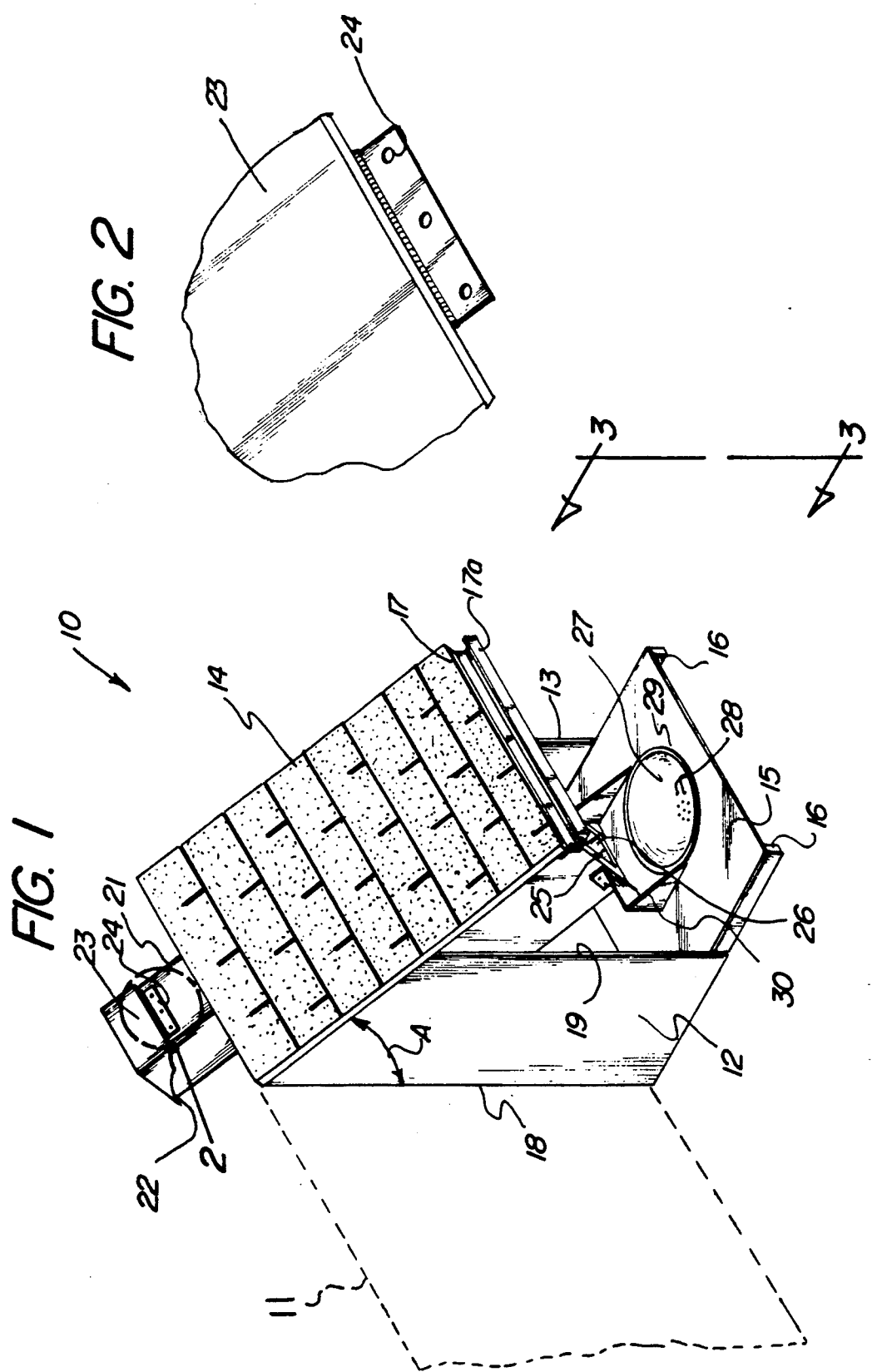

5,222,990

PET FEEDER APPARATUS

BACKGROUND OF THE INVENTION

1. Field of the Invention

The field of invention relates to pet feeder structure, and more particularly pertains to a new and improved pet feeder apparatus wherein the same permits remote filling of a food bowl within a fenced area.

2. Description of the Prior Art

In the feeding of dogs and the like within enclosures such as pens having surrounding fences, individuals typically feeding such dogs are required to enter the pen area, with the dogs associated jumping and accosting people attempting a feeding procedure. The instant invention attempts to overcome deficiencies of the prior art by providing for remote filling of food and fluid dishes within the designated pen containing the dogs therewithin. While prior art structure such as indicated in the U.S. Pat. Nos. 5,001,124; 4,699,089; and 4,966,099 have been utilized in the prior art, such prior art has heretofore failed to associated feeder structure relative to a fence in a manner as set forth by the instant invention to address the need of remote feeding and in this respect, the present invention substantially fulfills this need.

SUMMARY OF THE INVENTION

In view of the foregoing disadvantages inherent in the known types of pet feeder apparatus now present in the prior art, the present invention provides a pet feeder apparatus wherein the same permits remote filling of food dishes from exteriorly of an enclosure housing animals therewithin. As such, the general purpose of the present invention, which will be described subsequently in greater detail, is to provide a new and improved pet feeder apparatus which has all the advantages of the prior art pet feeder apparatus and none of the disadvantages.

To attain this, the present invention provides a feeder including a housing having spacer side walls, including an angulated roof overlying a floor, with the roof including a roof trough at a forward edge of the roof to direct rainwater away from the floor surface. The organization is arranged to include at least one feeder bowl mounted within the floor, with a chute directed rearwardly of the housing projecting through an associated fence wall to permit filling selectively of food within the bowl exteriorly of the fence.

My inventions reside not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not separate from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is either intended to define the invention of the application, which is measured by the claims, nor is it intended to be limiting as to the scope of the invention in any way.

It is therefore an object of the present invention to provide a new and improved pet feeder apparatus which has all the advantages of the prior art pet feeder apparatus and none of the disadvantages.

It is another object of the present invention to provide a new and improved pet feeder apparatus which may be easily and efficiently manufactured and marketed.

It is a further object of the present invention to provide a new and improved pet feeder apparatus which is of a durable and reliable construction.

An even further object of the present invention is to provide a new and improved pet feeder apparatus which is susceptible of a low cost of manufacture with regard to both materials and labor, and which accordingly is then susceptible of low prices of sale to the consuming public, thereby making such pet feeder apparatus economically available to the buying public.

Still yet another object of the present invention is to provide a new and improved pet feeder apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of section 2 as set forth in FIG. 1.

DESCRIPTION OF THE PREFERRED EMBODIMENT

Figure 3:
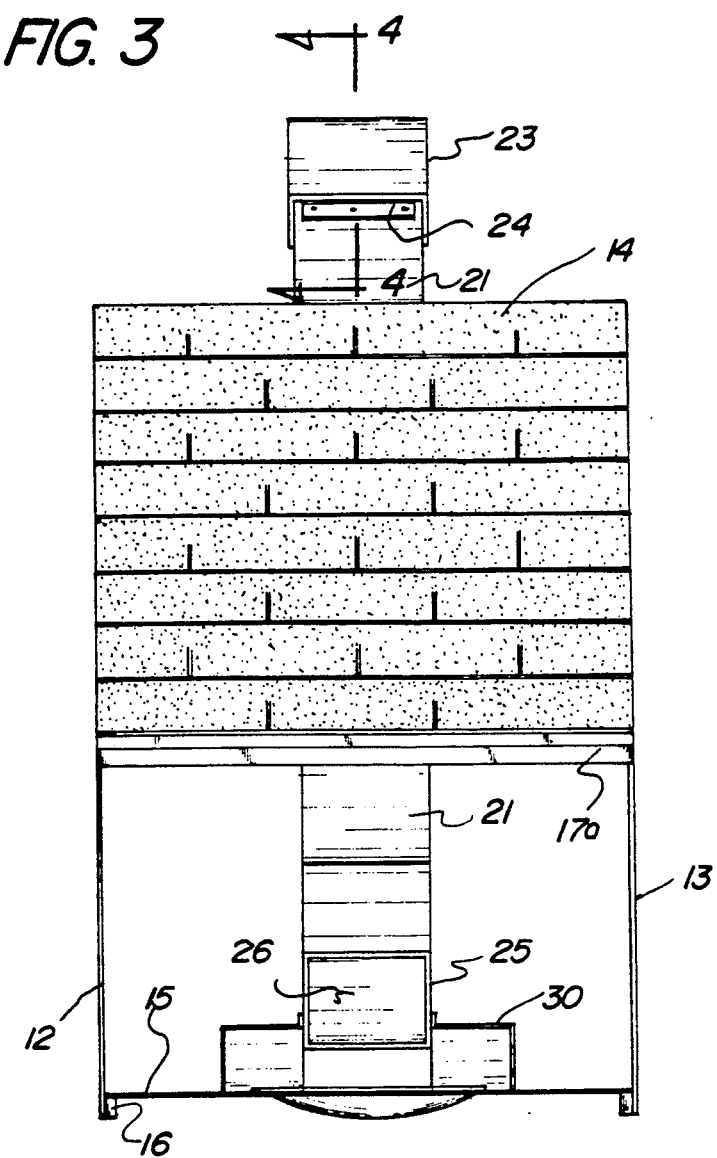
FIG. 3 is an orthographic view, taken along the lines 3—3 of FIG. 1 in the direction indicated by the arrows.
Figure 4:
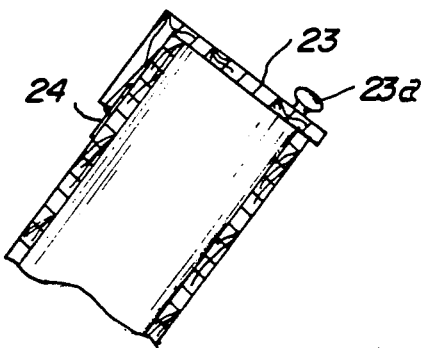
FIG. 4 is an orthographic view, taken along the lines 4—4 of FIG. 3 in the direction indicated by the arrows.

With reference now to the drawings, and in particular to FIGS. 1 through 9 thereof, a new improved pet feeder apparatus embodying the principles and concepts of the present invention and generally designated by the reference numeral 10 will be described.

More specifically, the pet feeder apparatus 10 of the instant invention essentially comprises the organization mounted within a pen, and more specifically in contiguous communication with a fence wall 11, as indicated in FIG. 1. The apparatus includes a housing having a housing first side wall 12 spaced from, parallel to, and coextensive a housing second side wall 13. The first and second side walls 12 and 13 include respective first and second upper edges mounting fixedly a roof plate 14, with each side wall including a side wall first side edge 18 spacer from a side wall second side edge 19, with the edge 18 spaced from a side wall second side edge 19, with the roof plate 14 extending from the first side edge beyond the second side edge. Further it should be noted that the roof plate is oriented at an acute included angle "A" relative to the first side edge 18 of each side wall. The roof plate 14 includes a roof plate forward edge 17 mounting a U-shaped rain through 17a fixedly and coextensively therewith. The housing is arranged to include a floor 15 orthogonally and fixedly mounted between the side walls 12 and 13 spaced above a lowermost edge of each side wall utilizing elevation rod 16 mounted below the floor 15 to space the floor relative to an underlying ground surface to minimize contact of the floor with insects and the like and further provide for a spacing to permit reception of the feed bowl structure, to be described in more detail below.

A delivery chute 21 is fixedly mounted to the housing structure and to the roof plate and includes a first end 22 having a first end cap 23 hingedly mounted about a hinge 24, with the cap including a cap handle 23a (see FIG. 4) to permit lifting of the cap plate to provide access to the entrance opening of the delivery chute at the first end 22. The delivery chute includes a delivery chute second end 25 angulated at a further acute included angle relative to the floor 15 positioned thereabove defining an exit opening 26 positioned over a food support bowl 27. The food support bowl 27 includes a bowl upper annular flange 29 secured to the floor 15, with the bowl 27 extending below the floor. The bowl includes a plurality of drain apertures 28 directed medially of the bowl therethrough to permit drainage of excess fluid contained within the bowl structure. A U-shaped deflecting wall 30 is positioned to include spaced legs on diametrically opposed sides of the bowl 27 having the delivery chute second end 25 secured thereto to align and fixedly position the delivery chute relative to the bowl 27.

Figure 5:
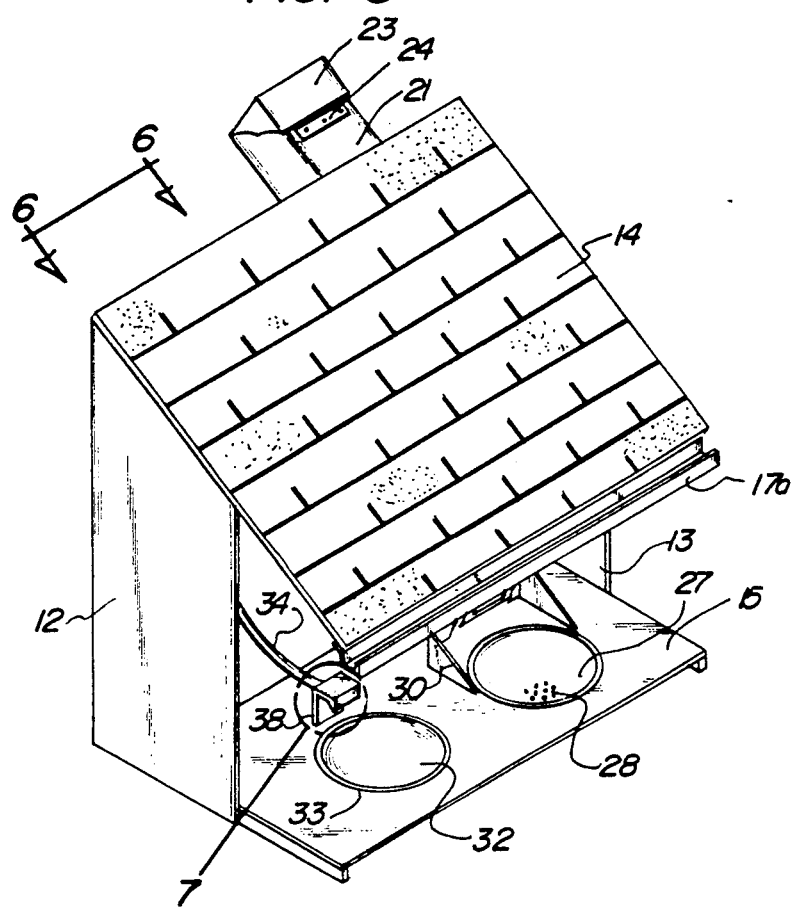
FIG. 5 is an isometric illustration of the invention employing a fluid watering dish, as well as a granular food dish.
Figure 7:
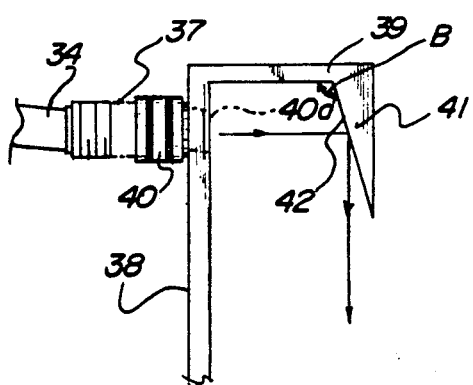
FIG. 7 is an orthographic view of section 7 as set forth in FIG. 5.
Figure 6:
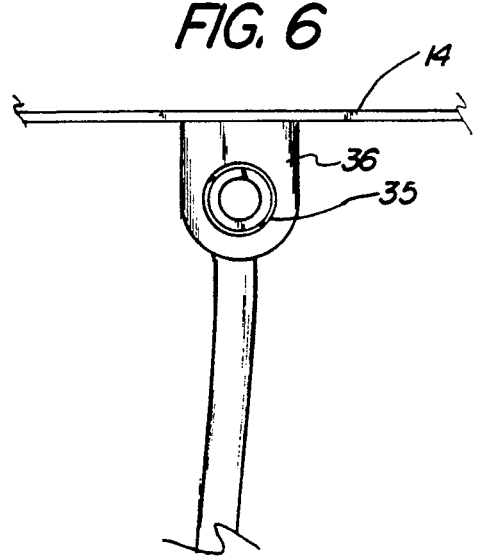
FIG. 6 is an orthographic view, taken along the lines 6—6 of FIG. 5 in the direction indicated by the arrows.

The FIG. 5 indicates the use of a fluid bowl 32 having a fluid bowl upper annular flange 33 mounted to the floor 15, with the fluid bowl 32 extending below the floor. A fluid conduit 34 is directed between the delivery chute 21 and the first side wall 12 having a conduit first end coupling 35 at a first end of the fluid conduit mounted to a first end support flange 36 (see FIG. 6) that in turn is fixedly secured to a bottom surface of the roof plate 14 projecting rearwardly in adjacency to the side walls first side edges 18 and optionally projecting rearwardly thereof to permit accommodation of a fluid delivery conduit (not shown), such as a garden hose and the like, secured to the first end coupling 35. The fluid conduit includes a fluid conduit second end coupling 37 directed within the housing positioned between the side walls first side edges 18 and the fluid bowl 32, with the second end coupling 37 mounted to a second end coupling support flange 38 that in turn is fixedly secured to the floor 15. The second end coupling support flange 38 includes a support plate top flange 39 orthogonally mounted to an upper distal end of the support plate parallel to and above the fluid bowl 32. A deflecting front wall 41 is provided having a front wall interior surface 42 in confronting relationship having an obtuse angle relative to a bottom surface of the top flange 39, with the support plate 38 having support plate coupling directed to a coupling conduit 40a directed through the support plate in confrontation with the deflecting front wall interior surface 42, wherein fluid directed through the fluid conduit 34 is directed through the coupling conduit 40a to impact the front wall interior surface 42 and direct such fluid downwardly onto the fluid bowl 32.

Figure 8:
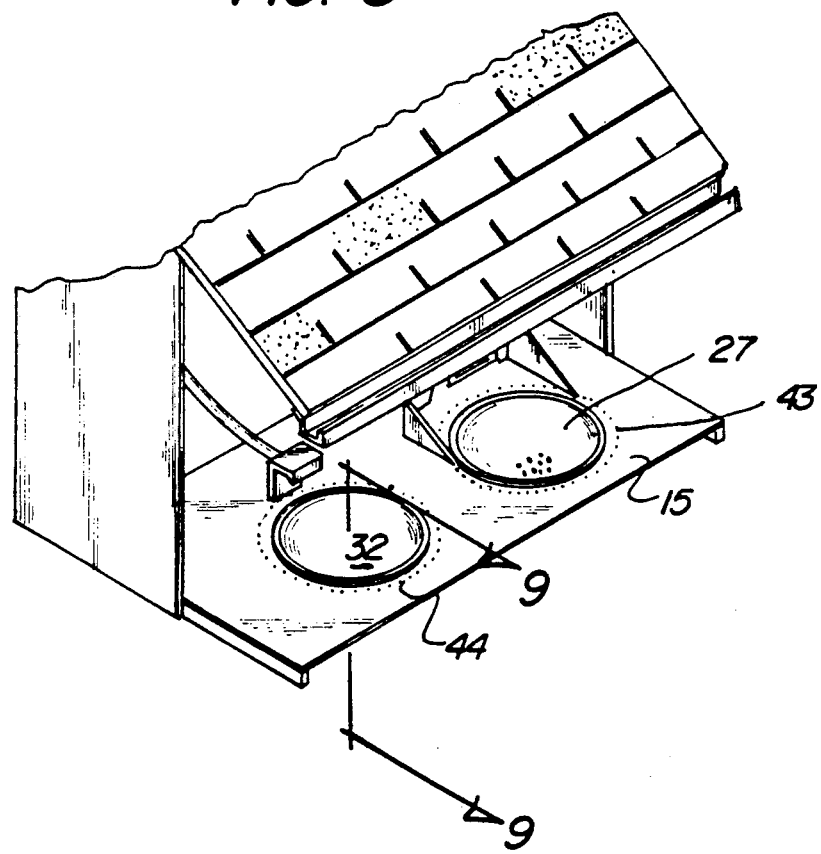
FIG. 8 is an isometric illustration of the floor structure of the invention employing an insect repellent structure.
Figure 9:
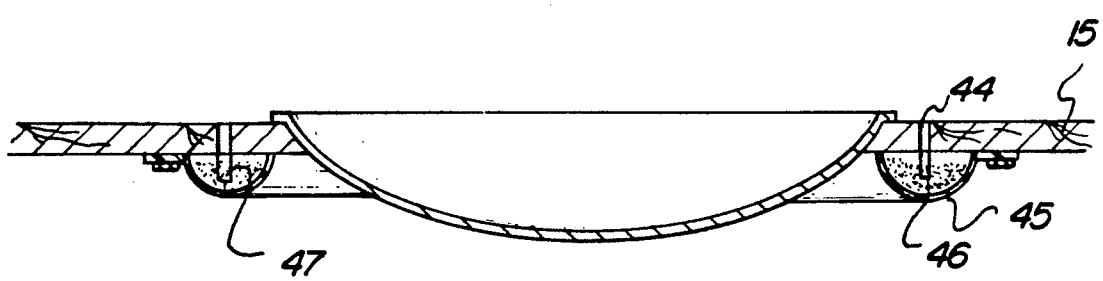
FIG. 9 is an orthographic view, taken along the lines 9—9 of FIG. 8 in the direction indicated by the arrows.

The FIGS. 8 and 9 indicate that each bowl of the food bowl and fluid bowl 27 and 32 respectively include respective first and second annular arrays of apertures 43 and 44 in surrounding relationship relative to each bowl, with an annular trough 45 positioned to a bottom surface of the floor 15 in surrounding relationship relative to each bowl, as indicated in FIG. 9. For purposes of illustration, the annular trough structure 45 is identical for each bowl structure, and wherein a fluid pesticide 46 is contained within the annular trough 45 to discourage insect infestation of the food and water of the feeding structure of the organization. The pesticide 46 is accordingly positioned below the top surface of the floor 15 to prevent access of an associated pet to the pesticide, while simultaneously permitting access of the pesticide through a wick 47 directed through each aperture. As illustrated, the annular trough 45 is removably mounted relative to the bottom surface of the floor to permit replenishment of pesticide therewithin on a periodic basis.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the inventions. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A pet feeder apparatus in combination with a fence wall, wherein the apparatus includes, a first side wall and a second side wall, and the first side wall and the second side wall arranged in a parallel and coextensive relationship, with the first side wall and the second side wall each including a wall first side edge in contiguous communication with the fence wall, and the first side wall and the second side wall each including a second side edge, and the first side wall and the second side wall each including a lower edge, and each side wall including an upper edge spaced above the lower edge of each respective side wall, and a roof plate fixedly mounted to the upper edge of each side wall extending from the first side edge of each side wall and projecting beyond the second side edge of each side wall, and a floor fixedly mounted orthogonally between the first side wall and the second side wall spaced above the lower edge of each side wall, and the roof plate extending over the floor, and the floor including a food support bowl contained within the floor, and the food support bowl including a bowl annular flange mounted to the floor, with the food support bowl extending below the floor, and the food support bowl positioned under the roof plate, and the roof plate is canted downwardly relative to the first side wall and the second side wall, and includes a predetermined acute angle between the roof plate and the first side edge of each of said first side wall and said second side wall, and the roof plate includes a roof plate forward edge, and the forward edge includes a U-shaped trough coextensive with the forward edge for deflecting rain water relative to the floor, and a delivery chute, with the delivery chute including a delivery chute first end and a delivery chute second end, with the delivery chute first end projecting beyond the first side wall and second side wall and through the fence wall, and the delivery chute first end including a first end cap, the first end cap including a cap hinge pivotally mounting the first end cap to the delivery chute first end.

2. An apparatus as set forth in claim 1 wherein the delivery chute second end is oriented in adjacency to the food support bowl and includes an exit opening positioned over the food support bowl, and a U-shaped deflecting wall having spaced wall legs mounted diametrically on opposed sides of the food support bowl, and a deflecting wall rear leg fixedly mounting the delivery chute second end thereto.

3. An apparatus as set forth in claim 2 wherein the delivery chute is inclined at a further acute angle relative to the floor.

4. An apparatus as set forth in claim 3 including a fluid bowl, the fluid bowl including a fluid bowl annular flange, with the fluid bowl annular flange mounted to the floor, and the fluid bowl positioned in adjacency relative to the food support bowl, and the food support bowl including a matrix of drain apertures directed through the food support bowl medially of the food support bowl.

5. An apparatus as set forth in claim 4 including a fluid conduit, the fluid conduit includes a conduit first end having a first end coupling, and a first end support flange mounted to the floor plate in adjacency to each side wall first side edge, with the first end coupling projecting through the fence wall, and the fluid conduit having a second end, with the fluid conduit second end including a second end coupling, and a second end coupling support plate having a support plate coupling mounting the second end coupling thereto, with the support plate orthogonally and fixedly mounted to the floor in adjacency to the fluid conduit, and the support plate having a support plate top flange orthogonally mounted to an upper edge of the support plate parallel to and spaced above the floor, and a deflecting front wall mounted fixedly to the support plate tap flange, with the deflecting wall including a deflecting wall interior surface defining an obtuse included angle between the front wall interior surface and the support plate, and the support plate coupling including a coupling conduit directed through the support plate and the coupling conduit aligned with the front wall interior surface.

6. An apparatus as set forth in claim 5 wherein the food support bowl and the fluid bowl each include an annular array of apertures in surrounding relationship, and each annular array of apertures directed through the floor, and an annular trough mounted in surrounding relationship relative to the food support bowl and the fluid bowl secured to the bottom surface of the floor, with each trough in communication with each annular array of apertures, and each trough including a fluid pesticide contained therewith in, and each aperture of said annular array of apertures including a wick directed into the fluid pesticide.

* * * * *